Feb. 23, 1960 W. W. JACOBUS 2,925,717
AFTERBURNER IGNITER
Filed June 16, 1959 3 Sheets-Sheet 1

INVENTOR.
William W. Jacobus
BY Arthur L. Collins
Attorney

Feb. 23, 1960 W. W. JACOBUS 2,925,717
AFTERBURNER IGNITER
Filed June 16, 1959 3 Sheets-Sheet 2

INVENTOR.
William W. Jacobus
BY
Arthur L. Collins
Attorney

Feb. 23, 1960

W. W. JACOBUS 2,925,717

AFTERBURNER IGNITER

Filed June 16, 1959

INVENTOR.
William W. Jacobus
BY Arthur L. Collins
Attorney

2,925,717
AFTERBURNER IGNITER

William W. Jacobus, Columbia, Conn., assignor, by mesne assignments, to the United States of America as represented by the Secretary of the Navy Application June 16, 1959, Serial No. 820,835

3 Claims. (Cl. 60—39.82)

This invention relates to an aircraft jet propulsion unit provided with afterburner apparatus, and particularly to the afterburner igniter.

The object of this invention is, primarily, to provide a new and improved afterburner igniter of the type which will inject a relatively high quantity of fuel as a single squirt into the hot combustor gases to reignite them so as to form a pilot flame which is propagated into the afterburner for ignition thereof.

It is also an object of this invention to eliminate fuel leakage from the igniter, especially into the squirt line.

Figure 1:
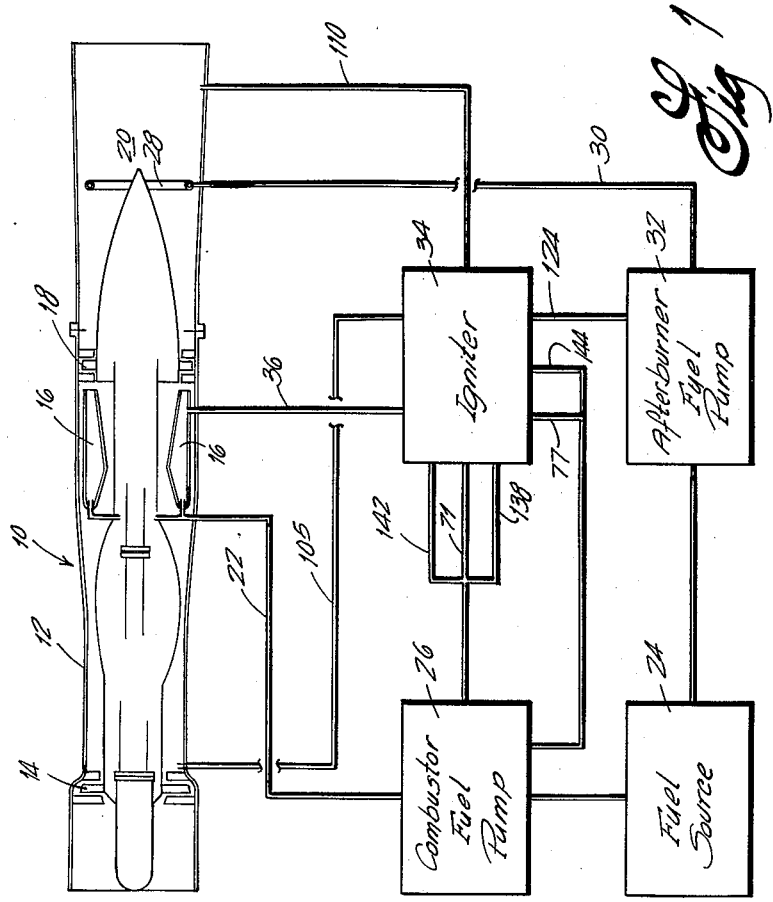
Fig. 1 is a schematic illustration of a power plant incorporating the invention.

In the drawing, 10 indicates a gas turbine power plant of any suitable construction for use in an aircraft having an open ended casing 12 provided with an axially aligned compressor 14, combustor 16, turbine 18, and afterburner 20. Fuel is supplied to the combustor 16 from a conduit 22 connected to a fuel source 24 through a combustor fuel pump 26; whereas a manifold 28 emits fuel into the afterburner from the fuel source to which it is connected by conduit 30 through afterburner fuel pump 32. Ignition of the combustor fuel is achieved by a spark igniter (not shown). A fuel injector type igniter 34 performs the same service for the afterburner fuel by injecting a fixed quantity of fuel into the hot gases from the combustor 16 through a tube 36 so as to form a temporary pilot flame which is propagated into the afterburner 20.

The afterburner igniter means 34 comprises, generally, a housing or body 38 having a fuel squirt valve 40 in which the required quantity of fuel is collected for forming the pilot flame, a diaphragm-actuated valve 42 which controls admission of combustor fuel pressure that actuates the squirt valve, a pilot valve 44 essentially for transferring afterburner fuel pressure from the squirt valve to open the diaphragm-actuated valve 42 so that combustor fuel pressure may actuate the squirt valve 40, a shut-off valve 46 controlling the flow of afterburner fuel into the igniter 34 and a differential fuel pressure valve 48 controlling the shut-off valve.

Figure 2:
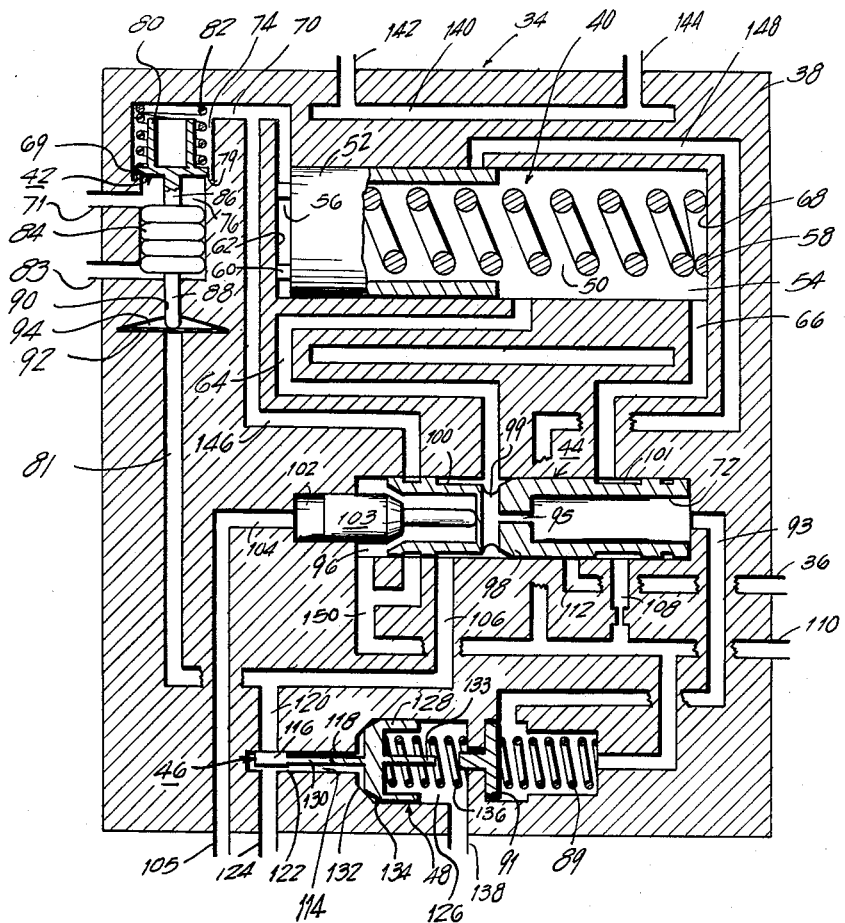
Fig. 2 is a cross-sectional view of the afterburner igniter in non-actuated condition.
Figure 3:
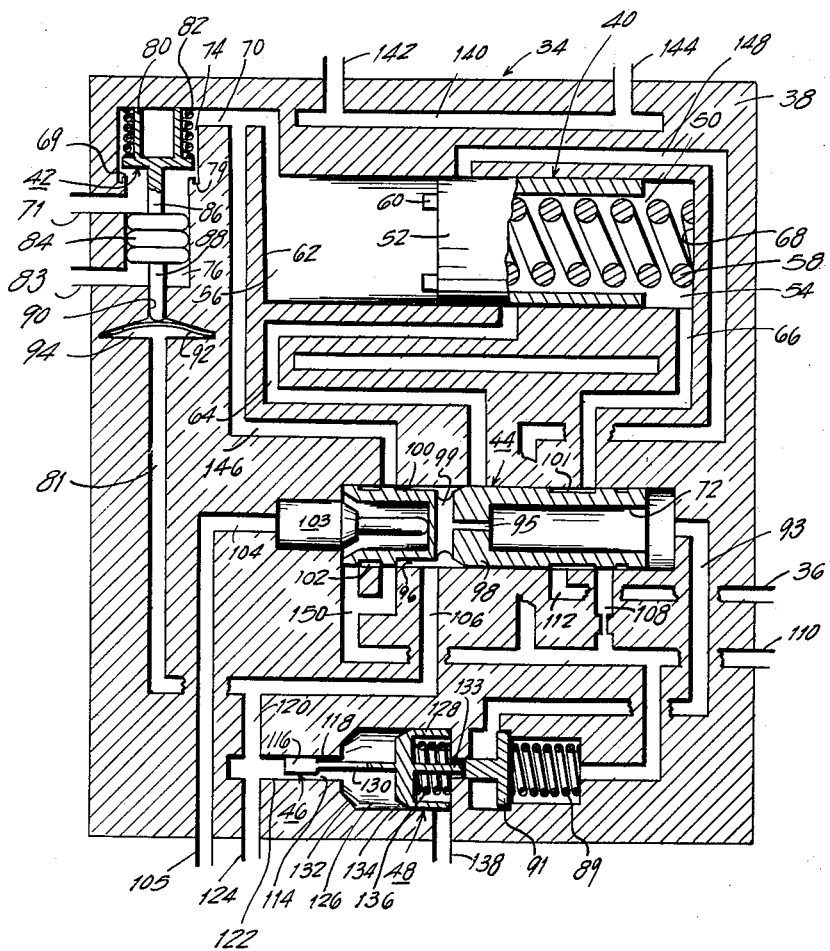
Fig. 3 is a showing similar to Fig. 2 with the igniter actuated.

The squirt valve 40 includes a horizontal, cylindrical valve bore 50 having an axially reciprocable cup-shaped valve member or piston 52 dividing the bore 50 into a squirt fuel chamber 54 and a pressure chamber 56. A spring 58 normally biases the piston 52 to the left toward the pressure chamber 56. One or more nipples 60 on the closed end of the piston 52 prevents it from abutting the end wall 62 of the valve bore 50. A fuel inlet passage 64 communicates with the fuel chamber 54 opening in the bottom of the peripheral wall forming the bore 50 intermediate its ends and near the open end of piston 52 when the piston is non-actuated as seen in Fig. 2. An outlet passage 66 opens into the bottom of the fuel chamber 54 near its fixed, right end wall 68. The pressure chamber 56 has a combustor fuel inlet passage 70 opening into it near the top of the left, fixed end wall 62 of bore 50 that communicates with combustor fuel pump 26 through the diaphragm-actuated valve 42 and conduit 71 when valve 42 is opened in a manner to be described hereafter.

The diaphragm-actuated valve 42 has a cylindrical, vertically disposed bore 74 one end of which opens into an axially aligned, reduced bore 76. A valve seat 69 in the form of an annular lip around the bore 76 projects from the shoulder 79 between the bores 74 and 76 into bore 74 and is adapted to receive a valve member 80 which is biased by a spring 82 to normally seat the valve member and close the bore 74 from bore 76. Valve member 80 is disk-like in shape and has a smaller diameter than that of bore 74 so that fluid may pass around it when unseated. Fluid passage 70 connects bore 74 to pressure chamber 56 of squirt valve 40 at all times. Conduit or passage 71 opening near the top of bore 76 provides a fuel pressure inlet from the combustor fuel pump 26. A conduit or passage 77 provides a fuel returning means to the combustor fuel passage 26.

A bellows member 84 is mounted within bore 76 and connected at its upper end by a rod 86 to the bottom of valve member 80. A rod 88 from the lower end of bellows 84 extends into a bore 90 that is axially aligned with bore 76 and seats on the center of a diaphragm 92 disposed in a lateral cavity 94, so that motion through flexing of the diaphragm is transmitted through the bellows to either raise or lower the valve member 80. A fuel inlet passage 81 provides a means of subjecting the under side of the diaphragm 92 to afterburner fuel pressure, whereas passage 83 vents the top side of diaphragm 92 to the atmosphere.

The pilot valve 44 has a horizontal bore 96 fitted with an axially reciprocable valve member or piston 98 cupped at its ends and provided with an annular groove 100 with a transverse passage 99. Annular groove 101 provides additional means for passing fluid across the pilot valve. A bore 102 extending to the left from the pilot valve bore 96 is fitted with a piston 103 and connected to compressor discharge pressure by a passage 104 and conduit 105 so that the pilot valve piston 98 is normally urged to the right.

An inlet conduit or passage 106 opening in the bottom of the pilot valve bore 98 normally communicates with the fuel chamber 54 of the squirt valve through transverse passage 99 in the pilot valve piston 98 and passage 64. Inlet passage 106 also communicates with inlet 81 which leads to diaphragm 92, and with the pilot valve piston bore 96 to the right of pilot piston 98 by way of transverse passage 99 and orifice 95. A passage 93 in the right end of pilot valve bore 96 leads to drain passage 110 through poppet valve 91 normally held open by spring 89. A restricted outlet passage 108 opening in the bottom of the pilot valve bore 96 normally interconnects the fuel chamber 54 of squirt valve 40 to drain in the nozzle portion of the aircraft by way of conduit 110 and squirt valve outlet 66. A second fuel outlet passage 112 opening in the bottom of the pilot valve bore 96 interconnects fuel chamber 54 of squirt valve 44 through its outlet 66, pilot piston groove 101 and conduit 36 to combustor 16 for fuel injection to ignite the afterburner.

The shut-off valve 46 has a horizontal bore 114 intersecting afterburner fuel inlet passage 124 at right angles provided with a reciprocable valve member 116 in sliding contact with the top wall 118 for covering and uncovering the opening of port 120 into inlet passage 106. The bottom wall 122 is not contacted by valve member 116 so that afterburner fuel pressure may always pass axially in bore 114 from conduit 124 leading from the afterburner fuel pump 32.

The differential fuel pressure valve 48 has a cylindrical bore 126 that is an enlarged axial extension from the right hand end of shut-off valve bore 114, and has within it a reciprocable cup-shaped piston 128 having the closed end directed toward the shut-off valve and connected to it by a rod 130; thus, the shut-off valve member 114 is adapted to reciprocate with the differential fuel pressure valve piston 128. A frusto conical valve seat 132 diverging from the direction of the shut-off valve joins the shut-off valve bore 114 to the bore 126. A frusto conical surface portion 134 of suitable size is provided around the edge of the piston 128 so as to make a line sealing contact on the valve seat 132. The open end of piston 128 carries a compression spring 136 to urge the piston to the left and is subjected to combustor fuel pressure entering through an inlet conduit 138 connected to the combustor fuel pump 26. A prong 133 projects to the right from piston 128 that is adapted to engage an end of poppet valve 91 that is accessible from bore 126, so that the poppet valve may be seated with movement to the right of piston 128 and thereby close the pilot valve passage 93 from communicating with drain conduit 110.

A jacket 140 is provided around squirt valve 40 having an inlet 142 and outlet 144 connected to combustor fuel pump 26 for circulating fuel therefrom and to keep the squirt valve 40 cool.

Vent passages 146, 148 and 150 are interconnected with drain conduit 110 to provide venting means for the squirt and pilot valves.

In operation, when the afterburner signal is on, afterburner fuel pressure from pump 32 enters shut-off valve bore 114 and overcomes the pressure normally applied on the right side of piston 128. Piston 128 translates to the right from its seat 132 exposing a larger piston area to afterburner fuel pressure giving it a snap to the right. Poppet valve 91 thereby becomes seated and shut-off valve member 116 uncovers the port to inlet 106 allowing fuel to flow through transverse passage 99 in the pilot valve and passage 64 into fuel chamber 54 of squirt valve 40. As chamber 54 fills, air is displaced and leaves through outlet passage 66, groove 101 of the pilot valve, and through the restricted outlet 108 to the drain conduit 110. When chamber 54 is full the resistance of restricted outlet 108 results in a back up of fuel pressure and fuel flow through the orifice 95 and into the pilot valve bore. Since the outlet therefrom is closed with seating of the poppet valve 91 this pressure translates pilot valve piston 98 to the left, easily overcoming the compressor pressure applied on the left side of the pilot valve piston 98. The movement of the pilot valve piston 98 seals off the inlet of fuel to chamber 54.

Afterburner fuel pressure is, therefore, then transmitted through inlet 81 to the underside of diaphragm 92 the force being transmitted through the bellows 84 to unseat the valve member 80. On this upward movement fuel pressure is introduced from pump 26 and conduit 71 into the pressure chamber 56 to the left of piston 52 of the squirt valve 40. Piston 52 is forced to the right and fuel from the fuel chamber 54 is expelled through passage 66 and groove 101 on the pilot valve piston which now communicates with squirt line 112 and thence into the combustor.

When afterburner signal is off, combustor pump fuel pressure applied to the right side of differential fuel pressure piston 128 moves it to the left, thereby closing the shut-off valve and unseating the poppet valve 91. The right side of the pilot valve bore 96 now can drain through the poppet valve 91 into passage 110. Compressor pressure applied through line 104 to piston 103 and the pilot valve piston 98 thereby returns pilot piston 98 to the right and its normal position.

Valve member 80 again is seated since pressure no longer is applied to the underside of diaphragm 92 and fuel from pressure chamber 56 drains through passage 146 through the pilot valve and into drain line 110. Spring 58 returns piston 52 of squirt valve 40 to the left, its normal position.

Obviously many changes in the single embodiment shown and described are possible without departing from the essence of the invention. Accordingly, the scope of this invention is to be determined from the appended claims.

What is claimed is:

1. In a power plant equipped with a combustor, an afterburner, a source of combustor fuel pressure, an afterburner fuel pressure source, and a source of air pressure, an afterburner igniter comprising a fuel squirt valve having a bore and a piston therein dividing said bore into first and second chambers, inlet means connecting said source of afterburner fuel pressure to said first chamber, a restricted outlet leading from said first chamber, an outlet connecting said first chamber to said combustor, a pilot valve having a bore and a piston therein controlling flow into and out of said first chamber, a passage means connecting said source of air pressure to said pilot valve bore urging the piston therein in a first position permitting flow into said first chamber and therefrom through said restricted outlet, conduit means connecting said source of combustor fuel pressure to said second chamber, valve means in said latter conduit normally preventing flow into said second chamber, second conduit means connecting said latter valve with said inlet means, said pilot valve having an orifice for admitting flow from said inlet means into said pilot valve bore for moving said pilot valve piston to a second position upon said first chamber being filled with fuel whereby fuel flow is closed from said inlet means to said first chamber and therefrom through said restricted outlet and fuel pressure from said inlet means through said second conduit means opens said valve means permitting combustor fuel pressure to enter said second chamber to actuate the squirt valve piston and eject fuel from said first chamber through said outlet means.

2. The device of claim 1 including a shut-off valve in said inlet means normally closed by combustor fuel pressure preventing flow through said inlet means and adapted to be opened by afterburner fuel pressure.

3. The device of claim 1 including means for draining said igniter.

No references cited.